UNITED STATES PATENT OFFICE.

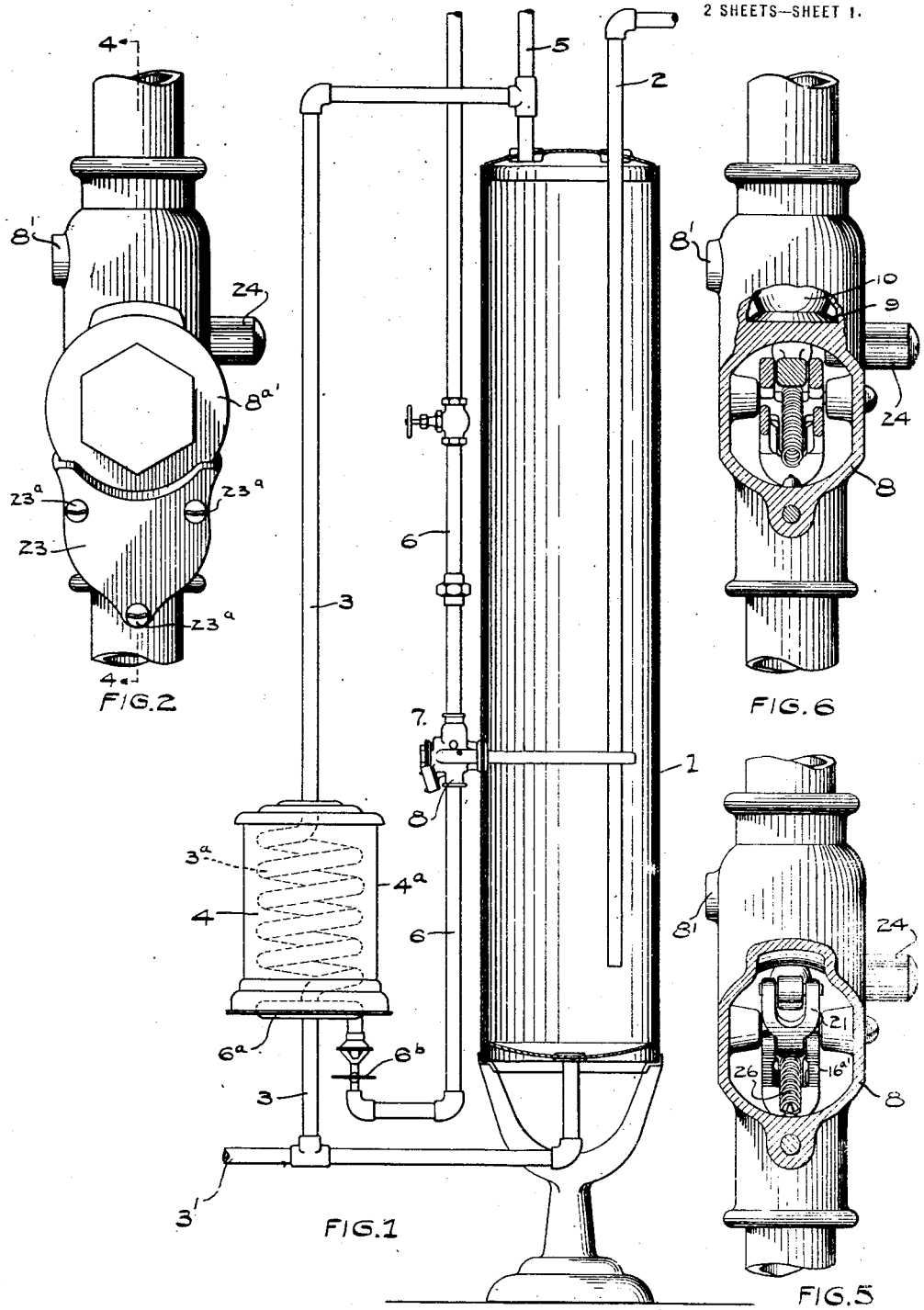

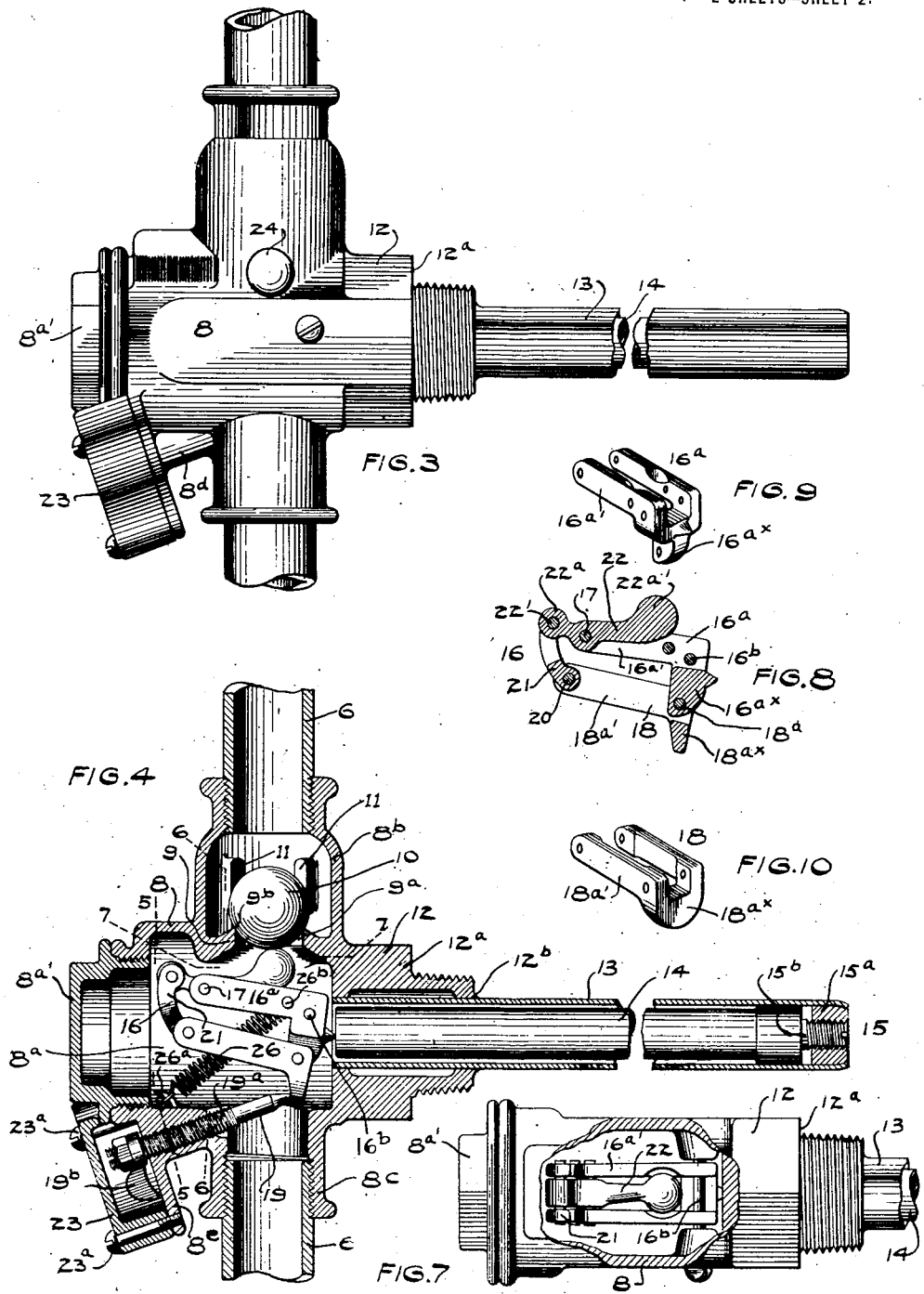

CARL M. YODER, OF CLEVELAND, OHIO, ASSIGNOR TO THE YODER-THOMAS MANUFACTURING COMPANY, OF CLEVELAND, OHIO, A CORPORATION OF OHIO.

OPERATING MECHANISM.

1,367,935.  Specification of Letters Patent.  Patented Feb. 8, 1921.

Application filed September 30, 1916. Serial No. 122,995.

*To all whom it may concern:*

Be it known that I, CARL M. YODER, a citizen of the United States, residing at Cleveland, in the county of Cuyahoga and State of Ohio, have invented certain new and useful Improvements in and Relating to Operating Mechanism, of which the following is a specification.

This invention relates to automatically controlled valve mechanism, particularly of the thermostatic type, especially adapted to control gaseous fuel, whereby the supply thereof may be economically controlled for heating purposes.

One object of the invention is to provide an improved valve operating mechanism capable of accurate and minute adjustment throughout a relatively wide range, whereby the medium to be heated can be kept at any desired degree of temperature.

Another object of the invention is to provide an improved system of levers capable of transmitting positive motion to the valve by a relatively small expansion or contraction of the thermostatic element or elements, whereby the valve will be opened and closed with a quick action due to operation of the thermostat through a relatively short range.

Another object of the invention is to provide a gravity operated valve and means which guide the valve to its seat.

Another object of the invention is to provide an improved mechanism adapted to operate the valve and at the same time insure the proper seating of the valve on its seat to avoid waste of fuel.

Another object of the invention is to provide an improved valve and operating mechanism therefor adapted to economically control the supply of fuel, whereby the cost of the latter is reduced to a minimum.

With these and other objects in view, the invention consists of the parts and combination of parts hereinafter described and set forth in the claims.

For the purpose of illustration I have, in the accompanying drawings, shown and herein described one form of mechanism embodying my invention.

Figure 1 is a view of a water tank in section, a heater therefor and a valve controlled mechanism, embodying my invention, associated with the tank for controlling the supply of fuel to the heater.

Fig. 2 is an end elevation of the valve controlled mechanism.

Fig. 3 is a side elevation of the valve controlled mechanism.

Fig. 4 is a longitudinal section on the line 4—4 of Fig. 2.

Fig. 5 is a section on the line 5—5 of Fig. 4.

Fig. 6 is a section on the line 6—6 of Fig. 4.

Fig. 7 is a section on the line 7—7 of Fig. 4.

Fig. 8 is a sectional view of the system of levers.

Figs. 9 and 10 are detail views.

In the drawings, I have illustrated the application of the invention for heating water in a tank and maintaining it at any desired temperature, but it is equally adapted to heat any other medium such as air in a room or confined space.

1 indicates a tank adapted to contain water. 2 indicates a water supply pipe, which is connected to the tank in any suitable manner. 3 indicates a pipe leading from the bottom of the tank 1. The pipe 3 passes up through a suitable heater 4; the pipe 3 is connected to a pipe 5 which is connected to the upper end of the tank 1 in a well known manner. 3' indicates a pipe for draining the tank 1. The pipe 3' is preferably connected to the pipe 3 leading from the bottom of the tank 1 to the heater 4. The pipe 3' may be controlled by a suitable valve (not shown). The pipe connections to and from the tank and between the heater and tank may be arranged in any desired way. The heater casing 4a is preferably of annular shape. The pipe 3 may be coiled within the casing 4a, as shown at 3a, in the usual manner.

6 indicates a fuel supply pipe, preferably for gaseous fuel, leading to a burner 6a in the lower part of the heater casing 4a. 6b indicates a valve for cutting off or regulating the supply of fuel at a point adjacent to the burner. The pipe 6 or a portion thereof is preferably arranged adjacent to the tank 1 so that the operating parts and thermostat of the valve mechanism, indicated as an entirety at 7, can be connected together in a simple manner.

The valve mechanism 7 is interposed in the pipe 6 so as to control the flow of gas therethrough to the burner 6a. Of this mechanism, 8 indicates a casing shaped and constructed in any well known manner to form a chamber 8a, and pipe sections 8b, 8c, to which the ends of the pipe 6 (see Fig. 4) are connected. 9 indicates an annular rim or flange extending inwardly from the internal wall of the pipe section 8b to form a valve opening 9a. The upper circumferential edge of the flange 9 is ground or otherwise finished to form a seat 9b for a valve 10. Preferably, the seat 9b is ground to a relatively fine edge. The chamber 8a is closed on one side by a cap 8a'. The cap is preferably provided with screw threads for engagement with screw threads on the inner wall of the casing 8. The valve 10 preferably comprises a ball of solid material normally resting on the seat and maintained thereon by its weight and the pressure of gas within the supply pipe 6. 11 indicates guides extending inwardly from the inner wall of the pipe section 8b. The guides 11 serve to guide the valve 10 in its up and down movements to insure its proper and quick seating on the seat 9b. I preferably provide a plurality of guides 11 and substantially and uniformly space them around the pipe section 8b. The guides 11 are preferably formed integral with the pipe section 8b. As shown in the drawings, the pipe section 8b may be enlarged to form sufficient space for the flow of gas past the guides to the valve opening.

At one side, the casing 9 is provided with a plug or head 12, preferably formed integral with the walls of the casing. At its outer end the plug 12 is provided with screw threads to fit a screw-threaded opening in the side wall of the tank 1. The screw-threaded portion of the plug 12 may be reduced to form a shoulder 12a which bears against the outer wall of the tank 1 when the plug 12 is connected thereto. The head 12 is connected to the tank 1 in a manner which prevents leakage through the connection.

12b indicates an opening extending through the plug 12 and adapted to receive the inner ends of the thermostat elements 13, 14. The element 13 preferably comprises a tubing formed from copper or other material capable of readily expanding under the influence of heat. The inner end of the tube 13 fits tightly within the opening 12b, preferably extending to the inner end thereof. The tube 13 may be soldered or otherwise secured in the opening 12b. The element 14 is preferably formed from some material, such as porcelain, which is not to any substantial extent affected by temperature changes. At their outer ends, the elements 13, 14, are connected together, as shown at 15, in any suitable manner, so that the expansion and contraction of the tube 13 will move the element 14 endwise in one direction or the other accordingly as the temperature of the water surrounding the tube 13 rises or falls. The connection 15 preferably comprises a plug 15a, which closes the outer end of the tube 13, having a screw-threaded opening through it and a rod 15b extending through the opening. The rod 15b is provided with screw threads to fit the screw-threads of the opening in the plug 15a and its outer end is formed with a suitable slot to receive a tool by which the element 14 can be adjusted longitudinally relative to the element 13. The outer end of the tube 13 may be secured to the plug 15a in any desired manner. Since the inner end of the element 13 is fixed to the casing 8 and its outer end is connected to the outer end of the element 14, it will be understood that when the temperature of the medium surrounding the element 13 rises, the latter expands and moves the element 14 endwise toward the right, as viewed in Fig. 4; on the other hand when the temperature of the medium falls, the element 13 contracts and moves the element 14 endwise in the opposite direction. The connection 15 is preferably of an air or gas and water tight character.

16 indicates the valve operating devices interposed between the valve 10 and thermostat elements 13, 14, and arranged in the chamber 8a. Of these devices, 16a indicates a main lever pivotally mounted in the chamber 8a in any suitable manner, but preferably by a horizontal shaft 16b, the opposite ends of which are supported in the opposite side walls of the casing 8. The lever 16a is preferably bell-shaped, having arms 16a', 16a$^x$. The arm 16a' of the lever 16a preferably comprises a pair of spaced members arranged to support at their free ends a pin or shaft 17, the purpose of which will be later described. 18 indicates a second lever pivoted to the free end of the arm 16a$^x$ of the lever 16a by a pivot pin 18a. The lever 18 is preferably bell-shaped having arms 18a$^x$, 18a', the latter comprising two members spaced apart to receive between them the arm 16a$^x$ of the lever 16a. The levers 16a and 18 are so arranged relative to the axis of the opening 12b that the inner end of the thermostat element 14 will engage the lever 16a at a point between its pivot 16b and the pivot 18a between the lever 16a and lever 18. When the thermostat element moves toward the left, as viewed in Fig. 4, it will tend to swing both levers 16a, 18, about the pivot 16b, but due to the provision of an abutment 19, in the path of movement of the lever arm 18a$^x$, the movement of the thermostat element 14 will result in swinging the free ends of the lever arms 16a', 18a', away from each other. On account of the length of the lever arms 16a', 18a', as compared with the length of the arms 16a$^x$, 18a$^x$, respectively, a short movement of the latter arms will cause considerable movement of the arms 16a', 18a'. As these arms move away from each other simultaneously and toward each other simultaneously, their rate of movement is substantially doubled. At their outer free ends, the spaced members comprising the lever arm 18a' carry a pin or shaft 20 on which is loosely mounted a link 21. 22 indicates a lever pivotally mounted on the shaft 17. One arm 22a of the lever 22 is pivotally connected at 22' to the upper or free end of the link 21, while its opposite arm 22a' is swingable upwardly through or toward the valve opening into engagement with the valve 10. The upper end of the link 21 is preferably bifurcated so that the lever arm 22a can be disposed between them and the pivot 22' be supported at its opposite ends by said bifurcations. With these parts constructed and arranged as just described, operation of the levers 16a, 18, away from each other due to movement of the element 14 toward the left, will simultaneously cause the pivot 17 to move upwardly and the arm 22a to swing downwardly; due to this simultaneous operation and the fact that the arm 22a is relatively short and the arm 22a' relatively long, the latter will be quickly actuated to unseat the valve 10. Furthermore, by pivoting the lever 22 so that its valve engaging end, in swinging, intersects the axis of the valve opening 9a, its engagement with the valve, in unseating it, serves to rotate the latter each time the valve is operated, and thus prevents it from engaging its seat in the same place when returning thereto. This operation is advantageous because if carbon or other foreign matter should collect on the valve, the fact that it will, on re-seating, engage the seat at different points, insures positive closing of the valve on its seat. The free end of the lever arm 22a' is preferably enlarged to form a weight which will tend to positively swing the lever downwardly as the thermostat element 14 moves toward the right, due to rise in temperature of the medium in the tank 1.

When the element 14 moves toward the right, due to rise in temperature of the medium in the tank 1, it permits the levers 22, 16a and 18 to swing downwardly, due to their weight, to normal position. As the valve engaging end of the lever 22 recedes the valve 10 follows it downwardly until it seats itself on the valve seat 9b.

The abutment 19 is preferably adjustable to different positions so that the temperature of the water in the tank 1 can be kept at any desired temperature within certain limits. In other words; by moving the abutment 19 toward or from the lever arm 18a$^x$, the latter may be caused to engage the abutment at any desired time in the forward movement of the levers 16a, 18, and thus regulate the opening and closing of the valve 10. For this purpose the abutment 19 preferably comprises a rod provided with screw-threads 19a which fit a screw-threaded opening 8d formed in the casing 8. The opening 8d is preferably formed in a thickened portion of the casing wall so that a long screw-threaded opening therethrough may be provided to prevent the escape of gas. To the other end of the rod 19 is fixed a hand or pointer 19b, which is movable relative to a suitable scale or graduations on a plate 8e, whereby the temperature of the water can be intelligently controlled. The plate 8e is preferably formed integral with the casing 8. As it is desired to prevent molesting with the temperature control device 19, the pointer 19b which may serve as the means for adjusting the abutment 19, is inclosed by a cover 23. The cover 23 may be held in place by a plurality of screws 23a.

24 indicates a by-pass for gas from the pipe section 8b to the chamber 8a, whereby sufficient gas is at all times supplied to the burner 6a to keep the same lighted. The by-pass is provided with an adjustable element (not shown) to regulate the flow of gas therethrough to a minimum amount. When desired a separate pipe may lead from the casing 8 to a pilot (not shown) adjacent the burner 6a. For this purpose one wall of the casing 8 is thickened as shown at 8' in order that a suitable pipe connection can be made therewith. While the weight of the levers 16a, 18a, 22 and link 21 will tend to swing them downwardly about the pivot 16b as the thermostat element 14 moves toward the right, I prefer to provide a spring 26 to augment this action. The spring 26 is connected at one end to a lug 26a formed on the inner wall of the chamber 8a; at its opposite end it is connected to a rod 26b extending between the members 16a' of the main lever 16a.

From the foregoing description it will be seen that the levers 16a, 18, link 21 and lever 22 are so connected together for coöperation that relatively slight movement of the thermostat element 14 will transmit relatively long and quick swinging movement of the lever arm 22a', so that the valve 10 will be actuated to unseat and seat the valve by relatively minute changes in temperature of the medium in the tank 1. The leverage ratio in a system of levers embodying my invention is so large that I am enabled to successively control the supply of fuel for heating rooms simply by supporting the thermostat elements therein.

The levers 16a and 18 are so shaped that they and the lever 22 can be correlated for operation in a relatively small chamber; at the same time each pivot for and between each of the levers, as well as the link 21, is supported in bearings at its opposite ends, thus permitting the levers and the link to swing without danger of disalinement at any time. Furthermore, the levers 16 are arranged in the chamber 8a through which the gas flows, so that complicated and undesirable constructions and arrangements of parts necessitating packing glands are avoided.

By my invention I am enabled to use a ball valve which seats itself automatically by gravity as soon as the valve operating mechanism returns to normal position and permits the pressure of the gas to maintain it on its seat until it is unseated therefrom by action of the thermostat.

To those skilled in the art of making mechanism of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:

1. The combination with a support having a valve opening through which fluid passes, and a valve for said valve opening, of means for operating said valve, said operating means including two members one carried by the other and each having operative connection with said support, and a thermostatic element acting on said members at a point between their operative connections with said support to cause the free ends of said members to swing relative to each other.

2. The combination with a support having a valve opening through which fluid passes, and a valve for said valve opening, of means for operating said valve, said operating means including two pivotally connected members each having at corresponding ends operative connection with said support, and a thermostatic element acting on said members at a point between their operative connections with said support to cause the free ends of said members to swing relative to each other.

3. The combination with a casing formed with a conduit and a valve opening, and a valve for the valve opening, of a pair of members pivotally mounted at corresponding ends, thermostatic means for actuating said members to substantially simultaneously swing their free ends away from each other, and a movable device controlled by the separation of said members for moving the valve to unseat it from the valve opening.

4. The combination with a casing formed with a conduit and a valve opening, and a valve for opening and closing said valve opening, of a pair of levers mounted to swing relative to each other, thermostatic means for actuating said levers, and a device operatively connected with both of said levers and arranged to be actuated thereby for controlling the said valve.

5. The combination with a casing formed with a conduit and a valve opening, and a valve for opening and closing said opening, of a pair of levers each having operative connection with said casing and mounted to swing relative to each other, means for operating said levers, said means acting on said levers at a point between their operative connections with said casing, and a device operatively connected with both of said levers and actuated thereby for operating said valve.

6. The combination with a casing formed with a conduit and a valve opening, and a valve for the valve opening, of a pair of levers, thermostatic means for actuating said levers to substantially simultaneously swing their free ends away from each other, a device controlled by the separation of said levers for moving the valve to unseat it from the valve opening, and means regulating the engagement of one of said levers with the casing.

7. The combination with a casing formed with a conduit and a valve opening, and a valve for opening and closing said valve opening, of a pair of levers, each having operative connection with said casing and swingable relative to each other, a member pivotally connected to each of said levers, one of said members being movable into engagement with said valve to operate it, means for pivotally connecting said members together, and means for operating said levers.

8. The combination with a casing formed with a conduit and a valve opening, and a valve for opening and closing said valve opening, of a pair of levers, each having operative connection with said casing and swingable relative to each other, a member pivotally connected to each of said levers, one of said members being movable into engagement with said valve to operate it, means for pivotally connecting said members together, and means for operating said levers, said means acting on said levers at a point between their operative connections with said casing.

9. The combination with a casing formed with a conduit and a valve opening, and a valve for opening and closing the valve opening, of a pair of pivotally connected levers mounted to swing in opposite directions substantially simultaneously, means for actuating said levers, a device operatively connected with one of said levers and controlled by the movement of said levers for operating said valve, and adjustable means interposed between one of said levers and the casing for controlling the engagement of said lever therewith.

10. The combination with a casing formed with a conduit and a valve opening, and a valve, of a main lever pivoted to said casing, a pair of levers carried by and pivoted to said main lever, one of the levers of said pair of levers being arranged to actuate said valve, an abutment with which the other lever of said pair of levers engages, a connection between said pair of levers, and a thermostatic element arranged to engage said main lever to swing it in one direction.

11. The combination with a casing formed with a conduit and a valve opening, and a valve, of a pair of levers swingable toward and from each other, a device pivotally supported by one of said levers for actuating said valve, a connection between the other of said levers and said valve actuating device, and thermostatic means for operating said pair of levers.

12. The combination with a casing formed with a conduit and a valve opening and a valve, of a pair of levers connected together and swingable toward and from each other, a lever pivotally supported by one of said levers for actuating said valve, a connection between the other of said levers and said valve actuating lever, and thermostatic means for operating said pair of levers.

13. The combination with a casing formed with a conduit and a valve opening, and a valve, of a pair of levers swingable toward and from each other, a lever for actuating said valve, said valve actuating lever being pivotally supported by one of said levers and being operatively connected with the other of said levers, and means including a thermostatic element for operating said pair of levers.

14. The combination with a casing formed with a conduit and a valve opening, and a valve, of a pair of pivoted-together levers swingable toward and from each other, a lever for actuating said valve, said valve actuating lever being pivotally supported by one of said levers and being operatively connected with the other of said levers, and means including a thermostatic element for operating said pair of levers.

15. The combination with a casing formed with a conduit and a valve opening, a valve, and a thermostatic element, of a pair of pivoted-together levers the load arms of which are swingable toward and from each other, one of said levers being mounted on a pivot about which said levers are swung by said thermostatic element, means arranged in the path of movement of the other lever to cause relative movement between the load arms of said levers when said levers are operated by said thermostatic element, and a lever for actuating said valve, said valve actuating lever being pivotally supported by one of said levers and being operatively connected with the other of said levers.

16. The combination with a casing formed with a conduit and a valve opening, a valve, and a thermostatic element, of a pair of pivoted-together levers the load arms of which are swingable toward and from each other, one of said levers being mounted on a pivot about which said levers are swung by said thermostatic element, adjustable means arranged in the path of movement of the other lever to cause relative movement between the load arms of said levers when said levers are operated by said thermostatic element, and a lever for actuating said valve, said valve actuating lever being pivotally supported by one of said levers and being operatively connected with the other of said levers.

17. The combination with a casing formed with a conduit and a valve opening, a valve, and a thermostatic element, of a main lever pivoted on said casing and arranged to be actuated by said thermostatic element, and a separate lever pivoted on said main lever and movable therewith, the load arms of said levers being swingable toward and from each other, a lever pivotally supported on said main lever for actuating said valve, a connection between said separate lever and said valve actuating lever, and means arranged to be engaged by the power arm of said separate lever for swinging the load arms of said levers away from each other.

18. The combination with a casing formed with a conduit and a valve opening, a valve, and a thermostatic element, of a main lever pivoted on said casing and arranged to be actuated by said thermostatic element, and a separate lever pivoted on said main lever and movable therewith, the load arms of said levers being swingable toward and from each other, a lever pivotally supported on said main lever for actuating said valve, a connection between said separate lever and said valve actuating lever, and adjustable means arranged to be engaged by the power arm of said separate lever for swinging the load arms of said levers away from each other.

19. The combination with a casing having a conduit and a valve opening, of a ball valve for opening and closing the valve opening, a thermostatic element, means, actuated by said thermostatic element, for operating said valve, said means being constructed and arranged to move the valve angularly each time it is unseated by said operating means, and means for guiding said ball valve vertically while it is being opened and closed.

20. The combination with a casing having a conduit and a valve opening, of a ball valve for opening and closing the valve opening, a thermostatic element, means, actuated by said thermostatic element, for operating said valve, said means being constructed and arranged to move the valve angularly each time it is unseated by said operating means, and spaced devices for maintaining said ball valve substantially centrally of the conduit and for guiding said ball valve vertically while it is being opened and closed.

In testimony whereof I affix my signature, in the presence of two witnesses.

CARL M. YODER.

Witnesses:
HARVEY O. YODER,
G. E. SWEET.